Patented Aug. 19, 1952

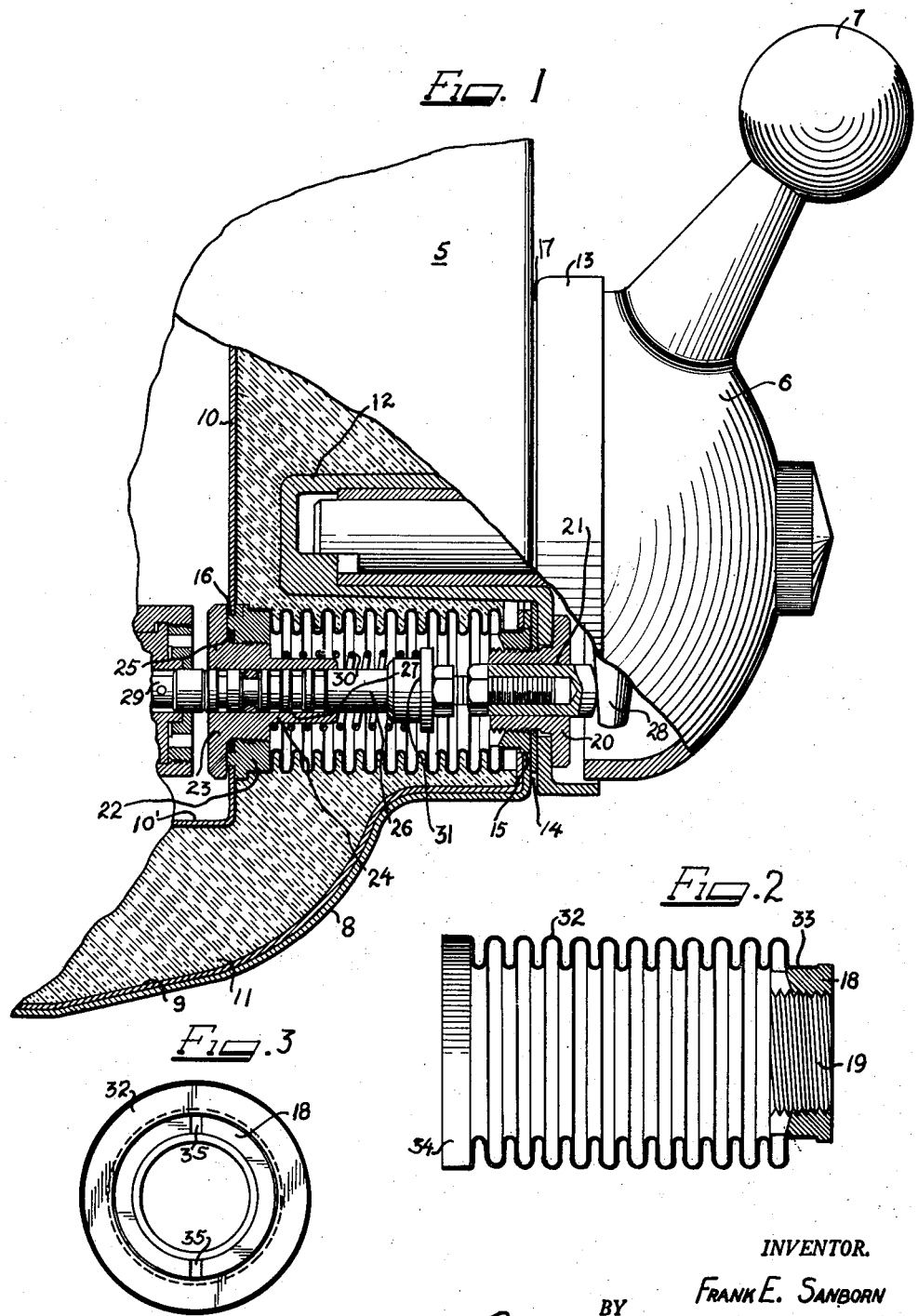

2,607,448

UNITED STATES PATENT OFFICE 2,607,448

BELLOWS SEAL FOR BEVERAGE DISPENSERS

Frank E. Sanborn, Chicago, Ill., assignor to The Dole Valve Company, Chicago, Ill., a corporation of Illinois Application November 22, 1946, Serial No. 711,491

4 Claims. (Cl. 189—34)

The present invention relates to a bellows seal and more particularly to seals made in quantity production for the valve actuating mechanism of dispensers for carbonated beverages wherein the syrups and carbonated waters are mixed at the time of discharge.

The seal of the present invention is designed to be manufactured on a quantity basis for assembly in devices such as beverage dispensers which also are made on a quantity basis.

The beverage dispensers with which the present invention is useful are constructed as cabinets with the walls provided with ice chambers for cooling the contents of the dispensers. Because of the fact that the walls are cool, insulating material is utilized outwardly of the cooling compartment to prevent too rapid melting of the ice.

It accordingly follows that the valve mechanism used with such a dispenser is spaced some distance from the front wall, consequently the stem for actuating the valve to open and close it is comparatively long.

It has been found that in the manufacture of such dispensers on a quantity basis sometimes slight variations in sizes occur which to some extent interferes with efficient manufacture and assembly.

To protect the valve stems of such dispensers from interference by foreign matter which may reach them, I aim to provide a new seal for the stem.

In order to adequately protect the stem and at the same time compensate for manufacturing inequalities and tolerances it is desirable that sealing means be capable of a slight amount of endwise adjustment, to lengthen or shorten such sealing means, and at the same time strong enough to prevent being distorted by undue pressure or by other causes.

It is accordingly an object of the present invention to provide novel sealing means in which the valve stem mechanism is effectively sealed against access of foreign matter to it.

Another object of the present invention is to provide a seal for beverage dispensers or the like which seal is applied about the valve stem and which seal is capable of slight endwise adjustment to accommodate it to manufacturing inequalities and tolerances.

A further object of the present invention is to provide a bellows seal especially adapted for use in a beverage dispenser or the like.

Another and yet further object of the present invention is to provide means for sealing the valve actuating mechanism of a beverage dispenser against access of any foreign matter to the mechanism and which sealing means may be made on quantity basis for assembly in dispensers which were also manufactured on a quantity basis.

In accordance with the general features of the invention there is provided a reciprocable valve actuating stem adjustable to extend through a given wall, guide means therefor and an expansible and contractible bellows like seal enveloping said stem and connected to said guide means.

The above, other and further objects of the present invention will be apparent from the following description and accompanying drawings.

An embodiment of the present invention is illustrated in the accompanying drawing and the views thereof are as follows:

Figure 1 is a fragmental view partially in elevation and partially in vertical section of a portion of the valve actuating mechanism of a beverage dispenser and showing the positions of the parts when the valve is closed and with one form of sealing means of the present invention thereto applied.

Figure 2 is an axial section through a bellows seal of the present invention, and Figure 3 is an end view of the seal looking at the right hand end of Figure 2.

On the drawings:

Referring to Figure 1, reference character 5 designates a portion of the outer casing of a dispenser, 6 designates a valve actuating housing while 7 designates a handle integral with the housing to oscillate it for opening and closing a valve.

A portion of the bottom wall 8 of the dispenser is shown and which is lined at 9. 10 is a vertical partition parallel to but spaced from the front wall of the dispenser, that is the wall against which the valve and the housing 6 is supported. In a space between the partitions 10 and the front wall of the dispenser housing insulating material 11 is utilized to fill all of the space except that occupied by the various parts of the dispenser. 10' designates a substantially horizontal partition spaced from the bottom wall 8 between which partition and wall is additional insulating material.

Let into the front wall 14 of the dispenser is a cylindrical hub 12 which constitutes a part of the valve actuating mechanism. Against the outer surface of the front wall of the dispenser is a cup 13 which is formed preferably integrally with the part 12. A semi-cylindrical housing 6 is entered within the skirt of the cup 13 as may be noted from Figure 1.

The front wall 14 of the dispenser 5, near the lower portion thereof, is provided with an aperture 15. The partition 10 is provided with an aperture 16, of greater diameter than the aperture 15 but in axial alignment with said aperture.

A gasket 17 is interposed between the front face 14 of the dispenser 5 and the cup 13.

A nipple 18 having a threaded interior 19, is secured in the aperture 15 in the front wall 14 of the dispenser. A flanged gland nut 20 is threaded into the interior 19 of the nipple 18 through an aperture in the gasket 17 and an aperture in the bottom of the cup 13. The nut 20 comprises a ring-like sleeve and has a bore 21 through it.

A second nipple 22 is secured in the aperture 16 of the partition 10. This nipple has a threaded opening in which is threaded a second gland nut 23 having an inwardly extending skirt 24 which extends part way toward the first gland nut 20. A gasket 25 is interposed between the nipple 22 and the gland nut 23 to seal the joint between them.

A valve stem 26 is disposed to slide in a bore 21 of the gland nut 20 and the bore 27 of the second gland nut 23. The gland nuts 20 and 23 constitute guides or guide means, for the valve stem 26 as it is reciprocated to open and close the valve of the dispenser.

Referring to Figure 1 it may be noted that the outer end of the valve stem 26 projects into the space within the housing 6 to there be engaged by a member 28 operative by oscillatory movement of the handle 7 to open the valve by movement of the valve stem by said member 28. The stem is moved to valve closing position by the spring 30.

A portion of the valve is designated at 29. Referring to the showing in Figure 1, the valve stem 26 is maintained in the position there shown, that is with its right hand end projecting into the space within the shell 6, by means of a spring 30 which surrounds the skirt 24 of the second gland nut 23 and which at one end bears against such nut, and the other end bearing against a shoulder 31 formed as a part of the valve stem.

The valve stem 26 is urged to the right, as illustrated in Figure 1, by action of the spring 30 and is moved to the left, to open the valve 29 by means of the member 28 moved by oscillation of the handle 7.

In order to prevent access of any foreign material to the valve stem, which material might be insulation, or might be liquid leakage, the valve stem is surrounded by a sealing means shown, in the present instance, as a bellows type seal 32.

Preferably, the bellows type seal 32 is made of thin metal so as to be resistant radially and at the same time enabling slight endwise movement of the bellows.

At the right hand end of the bellows as illustrated in Figure 2, is an integral collar 33 which surrounds a portion of the nipple 18 and is brazed to the nipple. The other end of the bellows 32 has an annular flange 34 which surrounds the nipple 22 and is secured to it in leak-tight relationship.

It will thus be noted that when the bellows 32 is applied in a manner stated the space within it is sealed against the admission of foreign matter, be it fluid or otherwise.

Referring to Figure 3 it will be noted that the outer face of the nipple 18 is provided with slots 35.

It will be noted that the provision of the sealing means 32, in the form of a bellows, will enable ready assembly of such bellows in a dispenser, where the distance between the gland nuts 20 and 23 may vary, due to manufacturing inequalities or other reasons, as the bellows may be very readily extended or foreshortened.

I claim as my invention:

1. In combination, a wall, a valve operating stem adjustably disposed in and extending transversely of said wall, guide means in said wall slidably receiving the ends of said stem, and an expansible and contractible bellows-like seal enveloping said stem between said guide means and connected to said guide means.

2. In a wall construction for a casing having a reciprocating member projecting therethrough, spaced partition members, a sleeve member in each of said partition members journalling the reciprocating member, filler material between said partition members and an adjustably extendable and contractible sealing tube extending between said sleeve members to prevent contact between the reciprocating member and said filler material.

3. In a wall construction for a casing having a reciprocating member projecting therethrough, spaced partition members, a sleeve member in each of said partition members journalling the reciprocating member, filler material between said partition members and a generally tubular flexible sealing member, said sealing member being adjustably extendable and contractible longitudinally and being secured between said sleeve members to prevent contact of said filler material with said reciprocating member and to accommodate slight misalignment of said sleeve members.

4. In a wall construction for a casing having a reciprocating member projecting therethrough, first and second spaced partition members, a guide member disposed in each partition member slidably receiving said reciprocating member, filler material between said partition members, a bellows secured at one end to said first partition member and in threaded engagement at the other end with one of said guide members, a gasket abutting said second partition member between said one guide member and said bellows, said gasket being forced in sealing engagement with said second partition member upon said one guide member being threaded into said bellows.

FRANK E. SANBORN.

REFERENCES CITED

The following references are of record in the file of this patent:

UNITED STATES PATENTS

| Number | Name | Date |
|---|---|---|
| 367,806 | Gaskill | Aug. 9, 1887 |
| 477,463 | Schier | June 21, 1892 |
| 600,249 | Parsells | Mar. 8, 1898 |
| 724,510 | Schutt | Apr. 7, 1903 |
| 1,892,547 | Benham et al. | Dec. 27, 1932 |
| 2,314,598 | Phelan | Mar. 23, 1943 |
| 2,384,512 | Wiken et al. | Sept. 11, 1945 |